United States Patent [19]

Mendelsohn et al.

[11] Patent Number: 5,114,982

[45] Date of Patent: May 19, 1992

[54] ACOUSTIC SCATTERING AND HIGH REFLECTION LOSS COMPOSITIONS

[75] Inventors: Morris A. Mendelsohn, Wilkins Twp., Allegheny County; Francis W. Navish, Jr., East Pittsburgh, both of Pa.; Richard Bolton, Saratoga, Calif.

[73] Assignee: Westinghouse Electric Corp., Pittsburgh, Pa.

[21] Appl. No.: 438,828

[22] Filed: Nov. 20, 1989

[51] Int. Cl.$^5$ .................. C08J 9/16; C08G 18/32; C08G 18/48

[52] U.S. Cl. .................. 521/59; 521/54; 521/137; 528/60; 528/65; 528/76; 528/80

[58] Field of Search .......... 528/65, 60, 76, 80; 521/137, 54, 59

[56] References Cited

U.S. PATENT DOCUMENTS

| | | | |
|---|---|---|---|
| 3,472,798 | 10/1969 | Pitchforth et al. | 521/54 |
| 3,632,703 | 1/1972 | Sullivan et al. | 521/54 |
| 3,864,181 | 2/1975 | Wolinski et al. | 521/59 |
| 4,038,238 | 7/1977 | Cravens | 521/54 |
| 4,379,904 | 4/1983 | Ehrlich et al. | 528/65 |
| 4,430,448 | 2/1984 | Schaefer et al. | 521/137 |
| 4,485,719 | 12/1984 | Mendelsohn et al. | 520/66 |
| 4,604,940 | 8/1986 | Mendelsohn et al. | 528/65 |
| 4,739,027 | 4/1988 | Mendelsohn | 528/60 |
| 4,798,851 | 1/1989 | Werner et al. | 521/137 |

Primary Examiner—John Kight, III
Assistant Examiner—John M. Cooney, Jr.
Attorney, Agent, or Firm—Daniel P. Cillo

[57] ABSTRACT

An acoustic foam composition comprising (a) about 1 equivalent of a polybutadiene based polyol (b) about 2.5 to 7.5 equivalents of a diisocyante (c) or low molecular weight diol which gives a balanced stoichiometry and (d) about 1.5 to 6% by weight based on the total weight of the composition of hollow polymeric microspheres. The composition may be prepared by a one-step system or a prepolymer system. The foam compositions of the present invention has excellent acoustic properties.

17 Claims, 5 Drawing Sheets

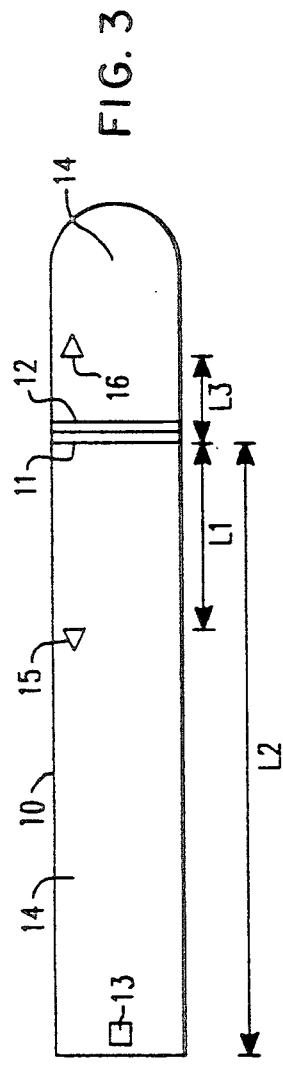
FIG. 3
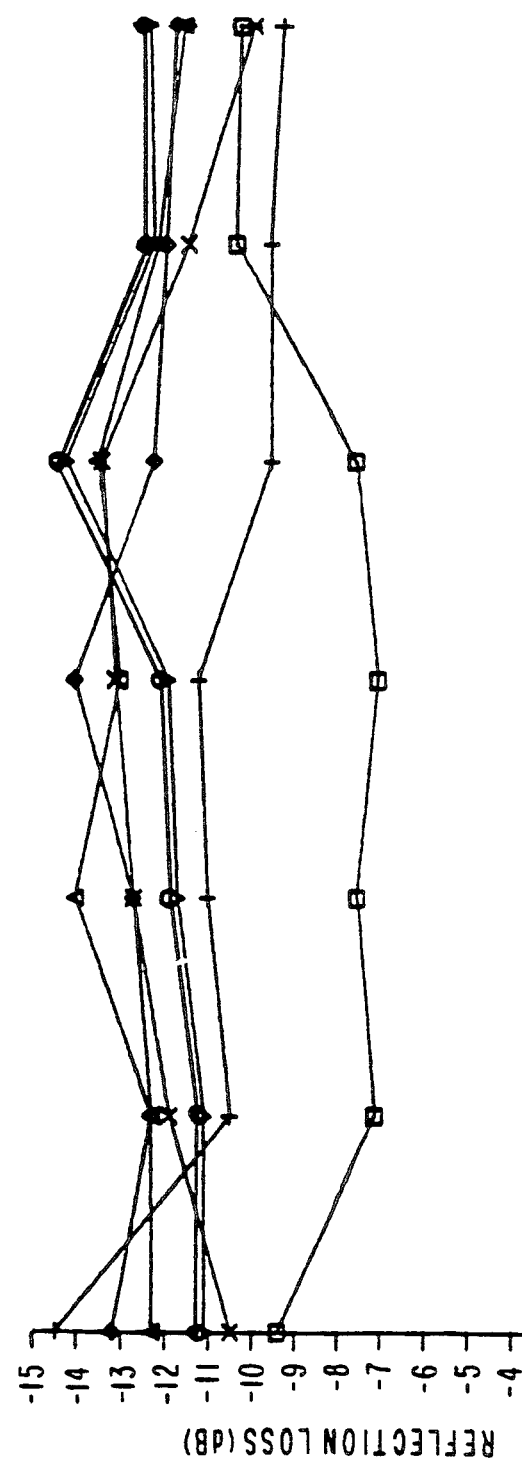
FIG. 4
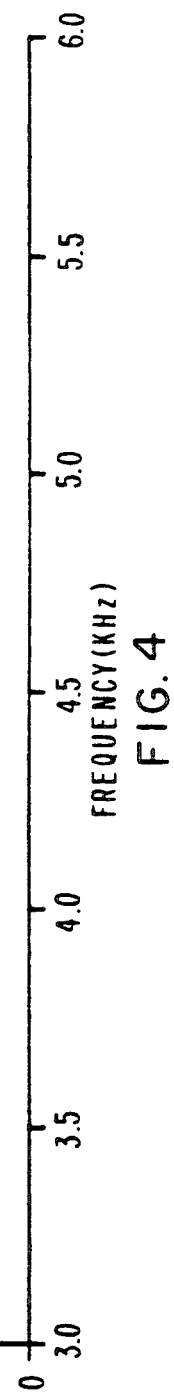

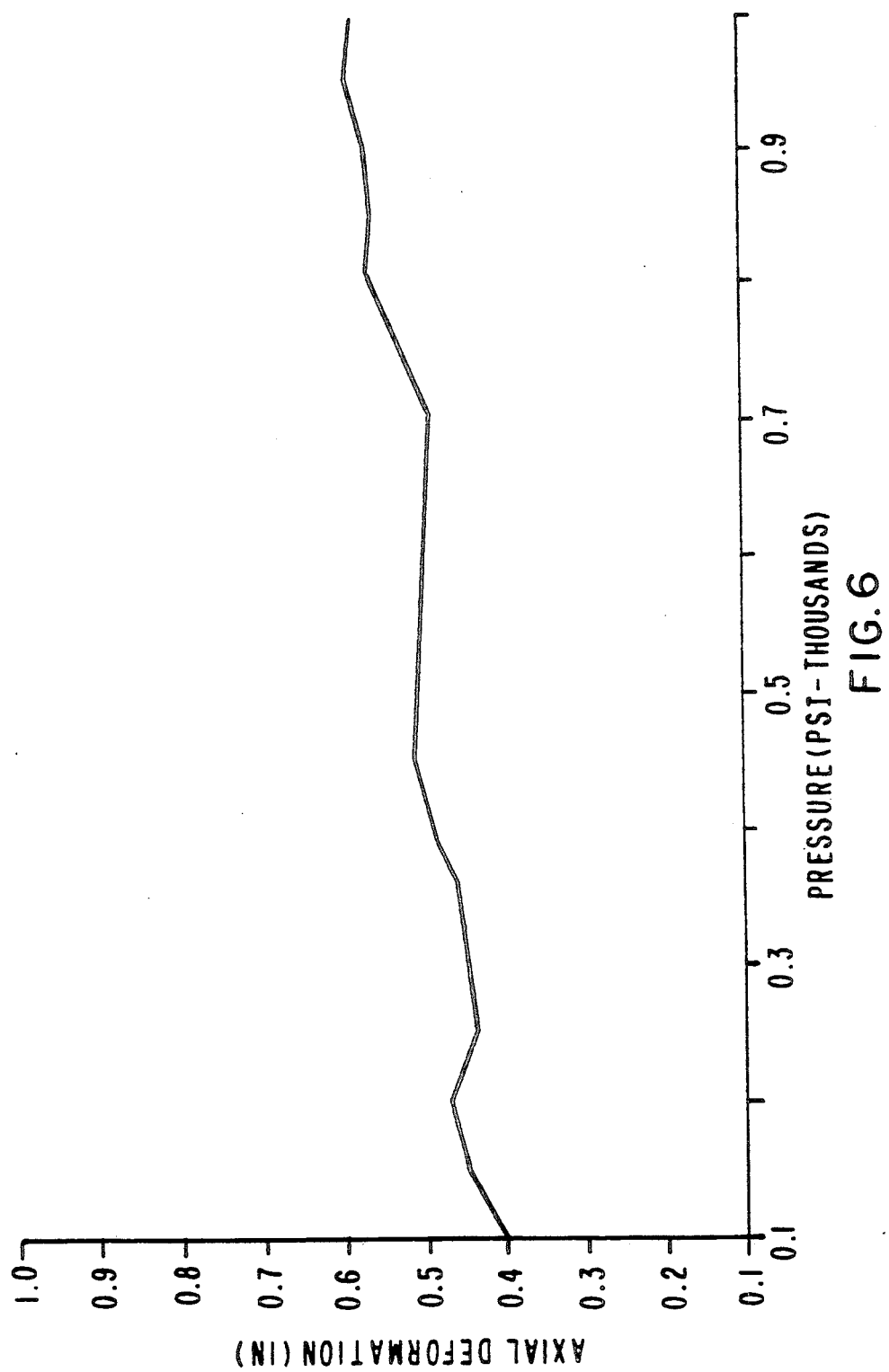

ACOUSTIC SCATTERING AND HIGH REFLECTION LOSS COMPOSITIONS

BACKGROUND OF THE INVENTION

1. Field of the Invention

The present invention relates to a sound absorption and reflection material, made from a particular elastomeric, syntactic polyurethane mixed with polymeric microspheres which is useful as a castable, moldable or sprayable composition on a wide variety of articles and substrates.

2. Description of the Prior Art

There are many instances where materials having good acoustic absorption and acoustic reflection characteristics would be valuable for sound reduction and sound scattering. Such material would be useful for commercial sound deadening applications in offices and the like. Such materials would also be useful for noise reduction applications for a variety of ocean going vessels. There is a prime need to suppress or control unwanted sound in underseas and surface vessels so as to reduce their detectability.

One method for reducing unwanted sound is to coat the object or substrate with some combination of materials effective to achieve quieting from background noise within a container and in some instances from incoming signals, such as sonar. Some coatings useful in this area are: decoupling coatings which will contain sound within the structure encased by the coating and limit sound radiation to the outside, and anechoic coatings which reduce the echo of an incident sonar signal by, for example, absorption or scattering.

Effective sound absorption and reflection coatings present the greatest difficulties for submergible vessels. We have found that the primary required materials properties include: low density coupled with compressive stiffness high enough to limit compressibility at full depth to small levels. The materials must be able to withstand broad temperature and pressure ranges in water over many cycles of application without displaying a significant level of permanent distortions or compressive set, or loss of adhesion to their substrate. The materials must have high damping with low frequency sensitivity so as to absorb sound vibrations over broad frequency ranges. The materials must have relative insensitivity to temperature changes and moisture, in order to be durable and have good acoustic properties over the whole span of applicable frequencies.

Ordinarily, materials that exhibit temperature insensitivity over large temperature ranges can be shown to be correspondingly insensitive to frequency, using time temperature superposition principles. Appropriate polymeric or other type materials must be capable of application as either cured cast tiles, mold-in-place compositions, or sprayable compositions.

Polyurethane elastomers are well known for demanding and sophisticated uses in marine and aerospace applications. Marine applications are taught in U.S. Pat. No. 3,632,703 (Sullivan et al.), relating to controlled gas entrapment in epoxy, or to a lesser extent, polyurethane resins, by means of encapsulation of either unbreakable plastic, or glass microspheres enclosing a vacuum or a gas, for use as an acoustic window in torpedo transducers. Here, the capsule-resin matrix is precompressed to deform or shatter the capsules, to provide a structural material having a product of velocity of acoustic propagation and density equal to that of sea water.

Aerospace applications are taught in U.S. Pat. Nos. 4,604,940 and 4,485,719 (Mendelsohn et al.), relating to flexible shock isolator pads and relatively rigid elastomeric launch seals, respectively. These materials were prepared from diol plus triol based diphenylmethane diisocyanate prepolymers extended with hydroquinone di($\beta$-hydroxyethyl) ether. Such materials, however, do not meet the basic requirements previously outlined and the use of the hydroquinone ether diol requires relatively high processing temperatures, which are impractical for casting in place against substrate or spray applications.

Use of microsphere filled, light weight polyurethanes for aircraft, missile, and other applications is taught in U.S. Pat. No. 3,472,798 (Pitchforth et al.). Here, from 5 wt. % to 50 wt. % of polyvinyl chloride is utilized to stabilize a suspension of polymethylmethacrylate microspheres containing neopentane gas, in a polyglycol mixture suitable for reaction with a dipropyleneglycol-toluene diisocyanate adduct and a catalyst. Density of the cured material ranges from 0.78 g/cm$^3$ to 1.15 g/cm$^3$, with a hardness, shore A, of 65 and 75, and tensile strengths of 496 psi and 805 psi respectively. The lower density materials are relatively soft. The use of polyvinylchloride, inert to the polyurethane, would detract from physical properties and possibly decompose to HCl gas on exposure to moderate heat. Lower density polyurethanes are taught in U.S. Pat. No. 4,038,238 (Cravens), where densities in the range of 0.5 g/cm$^3$ to 0.6 g/cm$^3$ are achieved. Here, xylene, toluene and the like are used to reduce viscosity in combination with glass or polymeric, hollow microspheres, dioctyl phthalate and a rapid polyurethane-forming composition The dioctyl phthalate acts as a plasticizer, degrading physical properties as does the xylene type materials which could easily diffuse from the cured structure so that physical properties could change over time.

What is needed is an acoustic absorption and low reflection material that displays very low sensitivity to wide changes in frequency and temperature and which resists the effects of high external pressure, as well as exhibiting good hydrolytic stability and excellent elevated temperature stability. The need for such a material has been generally known for some time. It is one of the main objects of this invention to provide a composition curable to such a material.

SUMMARY OF THE INVENTION

There is a need for materials that display a low sensitivity to wide changes in frequency and temperature and that also resists the effects of high pressure of the environment such as high pressure or moisture. The composition of the present invention displays inertness towards moisture and pressure. The acoustic absorption and reflection characteristics are superior for sound reduction in numerous commercial applications. The composition of the present invention uses a polybutadiene and a diisocyanate in admixture with gas filled microspheres in order to provide these properties.

As used herein, the term polyol is defined as an organic compound containing two or more alcoholic hydroxyl groups. The term diol as used herein is an organic compound containing two alcoholic hydroxyl groups. As used herein, the term diol is synonymous with the terms dihydric alcohol and glycol.

When the process involves a prepolymer, the microspheres are first added to the prepolymer. The additional high molecular weight polyol is added to the low molecular weight extender polyol rather than being incorporated into the prepolymer so that the viscosity of the prepolymer will not impart processing difficulties. The preferred prepolymer NCO:extender OH equivalents ratio is about 1:1. Processing temperatures for preparing the prepolymer generally range from approximately 80° C. to 115° C. and cure is generally accomplished at from 50° C. to 120° C.

Alternatively the material may be prepared by a one-step system. In the one-step systems all polyols and the isocyanate are combined directly without use of a prepolymer, the processing and curing temperature are generally at about 25° C. although higher temperatures may be employed.

Reflection losses for cured materials prepared by both types of processes over a wide frequency band averaged about 10 dB, whereas the insertion losses are lower but quite significant, while damping properties are excellent.

It is an object of the present invention to provide an acoustic coating that has low sensitivity to a wide range of frequencies and environmental conditions.

It is an other object of the invention to provide a polybutadiene-based polymer composition containing gas filled microspheres.

It is a further object of the present invention to provide a method of making a polybutadiene based composition using a one-step system.

It is yet another object of the present invention to provide a method of making a polybutadiene based composition using a prepolymer and extender.

These and other objects of the present invention will become apparent on reference to the description of the illustrations.

BRIEF DESCRIPTION OF THE DRAWINGS

In order that the invention can be more clearly understood, convenient embodiments thereof will now be described, by way of example, with reference to the accompanying drawings in which:

FIG. 3 is a simplified cross-section of an acoustic test apparatus used in the Examples;

FIG. 4 is a plot of reflection loss in dB vs. frequency for the material described in Example 2;

FIG. 6 is a plot of axial deformation (compressibility) in cm. of the material described in Example 2.

DESCRIPTION OF THE PREFERRED EMBODIMENTS

Figure 1:
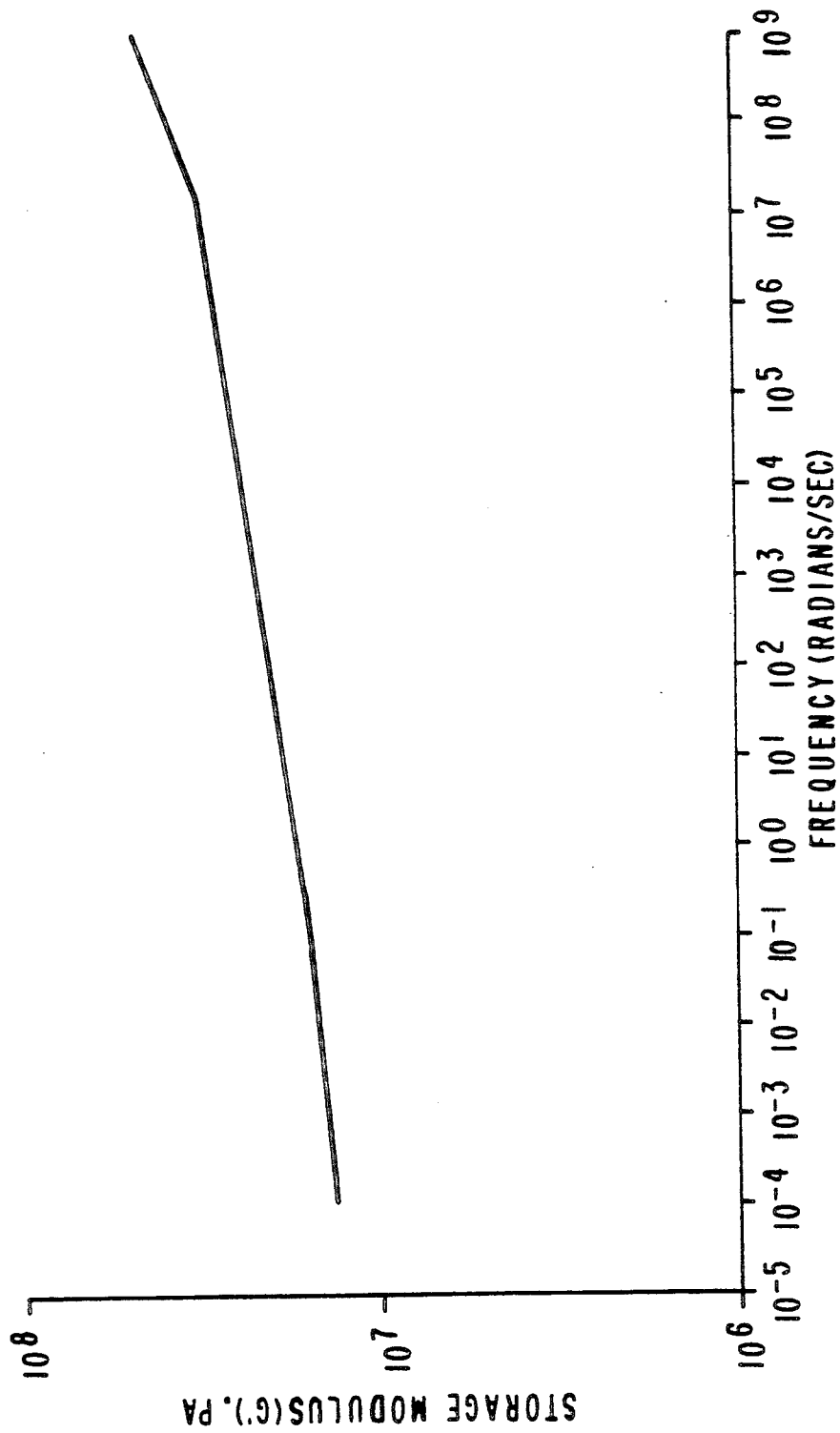
FIG. 1 is a time-temperature data plot shifted to 10° C., plot of storage modulus G' in Pa. (Pascal) vs. frequency in radians/second for the material described in Example 1.

Reaction of an isocyanate and polyol results in the formation of a urethane:

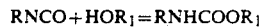

By the same reaction, polyhydroxyl materials will react with polyisocyanates to yield polyurethanes. These polyurethanes are well known in the art.

Possible diisocyanates may include aliphatic, aromatic or cycloaliphatic diisocyanates. However, aromatic and cycloaliphatic diisocyanates are preferred. Suitable isocyanates include, for example, isophorone diisocyanate, various isomers of toluene diisocyanate (TDI), 4, 4'-methylene-bis(phenylisocyanate), 4, 4'-methylene-bis(cyclohexylisocyanate) and the like.

It is preferred that polybutadiene based polyol be used having a molecular weight of about 500–10,000. However, a polybutadiene based polyol having a molecular weight of 1600–4000 is more preferred. Alternatively, a hydroxy terminated alkyl or alkene based oligomer may be used in conjunction with the polybutadiene based reactant. Also the polybutadiene based components may have amine groups which would also react with isocyanate groups to give an analogous polyurea structure. The most preferred polybutadiene based resin has a hydroxyl value of between about 0.7 and 0.9 meq./g and a hydroxyl number of about 39–51 mg KOH/g. The hydroxyl containing polybutadiene should have a hydroxyl equivalent weight of about 1100 to about 1400 and a hydroxy functionality of about 2–3. The microstructure units of the polyol are not restricted to repeating groups comprising carbon atoms. In addition, unsaturation may range from 1 double bond per 4 carbon atoms to 1 double bonds per 12 carbon atoms. Any combination of subgroups may have saturation. An example of a preferred average configuration for the polybutadiene polyol is:

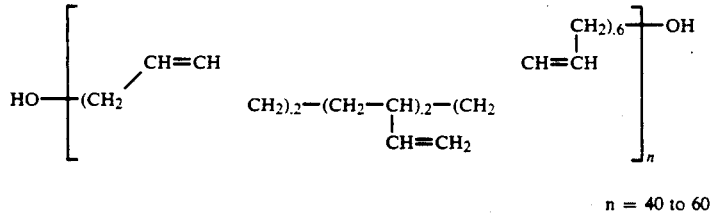

n = 40 to 60

In the case of the prepolymer system, the prepolymer consists of a polybutadiene based polyol that is reacted with a diisocyanate in a range of about 1.4 to 1:6 polybutadiene based polyol equivalents to diisocyanate equivalents, respectively The prepolymer and the extender are then reacted The extender consist of a polyol or mixture of polyols. It is preferred to employ a mixture of high and low molecular weight polyols such as a combination of diols in which one diol may have a molecular weight ranging from about 350 to about 4000, whereas, the other component may have a molecular weight from about 62 to about 300. Conversely, a single polyol may be employed whose average molecular weight would equal the average of the combination of the high and low molecular weight polyols Most preferably, the high molecular weight extender component may consist of either a polybutadiene based polyol or a polyether based polyol. The low molecular weight polyol may be of the aliphatic type or may contain an aromatic ring between aliphatic hydroxy containing substituents. Most preferred is an extender consisting of a combination of an approximately 1000 number average molecular weight polyoxytetramethylene diol and 2,2'-(m-phenylenedioxy)diethanol (also known as resorcinol di($\beta$-hydroxyethyl)ether or as HER) or 2,2'-(p-phenylenedioxy)diethanol (also known as hydroquinone di($\beta$-hydroxyethyl)ether or HQEE). Although normally the high melting characteristics of the resorcinol di(B-hydroxyethyl) ether or the hydroquinone di(B-hydroxyethyl) ether require high processing temperatures and thus render these compounds as undesirable for casting in place or for spray applications, the precombination of these with the low melting polyoxytetramethylene glycol provides processability at low temperatures such as at about 25° C.

Prior to combining the prepolymer and extender in an equivalents ratio ranging from 0.85:1.0 to 1.2:1.0 prepolymer:extender, and most preferably in a 1.0:1.0 ratio, hollow polymeric microspheres are mixed preferably into the prepolymer. Unexpanded spheres are preferred in a concentration ranging from 1 to 5 wt. % and more preferably from 2 to 4 wt. %. The cure is effected at elevated temperatures or at room temperature. Optionally, a catalyst may be used to promote the reaction.

The most preferred prepolymer system is prepared by treating about one equivalent of a polybutadiene based polyol having a hydroxyl equivalent weight of about 1100 to 1400 g/eg and an average molecular weight of about 2700 to 2900 g/mol with 4 to 6 equivalents of 4,4'-methylene-bis(phenylisocyanate). The most highly preferred extender composition uses from about 6:4 to 8:2 equivalents ratio of 2,2'-(m-phenylenedioxy)-diethanol to polyoxytetramethylene glycol having a molecular weight of about 1000, respectively. The most preferred equivalent ratio for reaction between the extender and prepolymer is from about 0.95:1.0 to 1.0:0.95.

In the case of the one-step system, it is preferred that the polybutadiene based polyol have a number average molecular weight of about 500–10,000 and a number average molecular weight range of 1600–4000 is most preferred. The polybutadiene based polyol should be of the same type as described earlier for use in the preparation of the prepolymer system. The polybutadiene polyol is combined with a low molecular weight polyol preferably having a molecular weight ranging from about 62 to about 300. The most highly preferred low molecular weight polyol for use in the one shot system is an alkane diol having from two to eight carbon atoms. Generally the equivalent ratio in terms of hydroxyl groups of the polybutadiene polyol to the low molecular weight polyol is in the range of 1:2 to 1:7. A small quantity of a catalyst may be added to this polyol mixture. Most preferred are tin or amine based catalysts. Hollow microspheres are then mixed into the polyol mixture. The preexpanded microspheres are preferred in a quantity ranging from 2 to 6 wt. % of the total mass of the polyurethane (polyols+isocyanate+microspheres).

An aliphatic or cycloaliphatic isocyanate is the preferred type of isocyanate for use in the one-shot system in order to provide an adequately long work time; however an aromatic polyisocyanate may also be used. The terms polyisocyanate or isocyanate components are used for compounds containing two or more isocyanate groups per molecule. The ratio of isocyanate to the total of the combined hydroxyl containing compounds can be in the range of 0.85 to 1.0 respectively to 1.20 to 1.0 respectively; however a value of 1.0 to 1.0 is most preferred. The isocyanate component is combined with the polyol containing system which preferably has been premixed so as to contain the polyols, catalyst if used, and hollow microspheres.

Hollow thermoplastic microspheres must be added to the composition of this invention. They are essential to provide good acoustic decoupling properties The polyurethane matrix resins were compounded by mechanical mixing with hollow polymeric microspheres in order to produce the desired syntactic foams. They cannot be made of glass due to the high sound reflective properties of glass. The microspheres are essentially spherically shaped particles with a shell consisting of a copolymer of vinylidene chloride, acrylonitrile, methyl methacrylate or similar composition as is well known in the art. Contained in the interior of the microspheres is a gaseous blowing agent, for example, isobutane. Any gaseous blowing agent that will not react chemically with the isocyanate or polyol ingredients may be used, however, isobutane is preferred. When the thermoplastic shell of the polymeric microsphere is exposed to a heat, it softens and is expanded by the pressurized blowing agent. Variations in the concentration of microspheres employed, the compositions of the outer shell and blowing agent and in processing can provide a variety of expansion and thus ultimate density characteristics. While the microspheres are almost always thermoplastic, in some instances a small amount of cross linking agent may be added to increase thermal stability and/or dimensional stability.

In the preparation of the syntactic polyurethane foam, one may employ either preexpanded polymeric microspheres or unexpanded microspheres which are expanded during processing such as during cure and/or from the exothermic heat from the polymerization reactions. The unexpanded spheres have the advantage of their greater ease of incorporation into the matrix resin. Whereas the pre-expanded spheres provide for more precise control of the ultimate density of the polyurethane. However, the pre-expanded spheres often undergo additional expansion as a result of the heat generated during the exothermic polymerization process.

In any case, the microspheres should have diameters of from 1 micrometer to 100 micrometers when they are added to the prepolymer. The diameter of the unexpanded spheres is usually from 3 micrometers to 10 micrometers, and the diameter of the pre-expanded (already expanded) spheres is usually from 10 to 60 micrometers. The microspheres will occupy from 30 vol. % to 70 vol. % of the finished product when constituting from 1.5 wt. % to 6 wt. % of the total composition, including the weight of the microspheres.

The composition of the one-shot material is preferably present in the following ranges: The polybutadiene based polyol comprises 1.0 equivalents. The low molecular weight polyol is present in an amount of about 2.0 to 6.0 equivalents, more preferably 3.0 to 6.0 and most preferably 3.5 to 4.5. The isocyanate is present in an amount of about 3.0 to 7.8 equivalents, more preferably 3.0 to 5.0 equivalent and most preferably about 4.5 to 5.5. It is most preferable that the sum of the hydroxyl equivalents be essentially equal to the number of isocyanate equivalents; however, variations of up to about 5% of equivalency may be preferentially employed. A catalyst may optionally be present in an amount of about 0.002 to 0.20% and more preferably when it consists of dibutyltin dilaurate or a similarly active material of 0.005 to 0.10%. The microspheres are present in an amount of about 1.5 to 6% and more preferably about 2.0 to 4.0%, of the total weight of the composition, including the weight of the microspheres.

The most preferable composition for the one-shot or one-step material utilizes the following ratio of materials. One equivalent of a polybutadiene based polyol having a hydroxyl equivalent weight ranging from 1100 to 1400 g/eg and a number average molecular weight of 2700 to 2900 g/mol, 3.5 to 4.5 equivalents of 1,4-butanediol, 4.5 to 5.0 equivalents of 4,4'-methylene-bis(-cyclohexylisocyanate), 0.01 wt. % to 0.03 wt. % dibutyltin dilaurate catalyst and 2.0 to 4.0 wt. % of preexpanded hollow polymeric.

In Example 1, a commercially available, preexpanded polymeric microsphere (551 DE, Expancel-A, Kema Nobel Co., Nobel Industries) was used. The thermomechanical properties of the microsphere show a starting expansion temperature of 98°-103° C. and a maximum expansion temperature of 140°-148° C. The particle size of the unexpanded spheres is about 6-9 D(POP)$\mu$ and 11-17 D(VOL)$\mu$. The pre-expanded spheres, which have been expanded before use, have a size range of 25-35 D(POP)$\mu$ and 40-60 D(VOL)$\mu$. The true density of the pre-expanded beads or microspheres is about 32-40 kg/m$^3$ (0.036 g/cm$^3$). In Example 2, unexpanded microspheres were filled with a blowing agent, isobutane (461 DU, Expancel-A, Kema Nobel Co., Nobel Industries). The unexpanded microspheres have an average particle size of 5-8 D(POP)$\mu$ or 10-16 D(VOL)$\mu$ and a thermomechanically analyzed (TMA) starting expansion temperature of about 103°-108° C. with a maximum expansion temperature of about 144°-152° C. Their density in the unexpanded form is about 1300 kg/m$^3$ or 1.30 g/cm$^3$.

Experiments were conducted to measure Shear Storage Modulus and Tan Delta. The experiments were conducted over a limited frequency range and over a broad range of temperatures in order to predict high frequency performance. This process is known as time temperature superposition (TTS). TTS correlates short time behavior at a high temperature to the expected behavior at long times several decades removed from the test time and/or frequency. The basis for TTS is in the retardation and relaxation times which constitute the viscoelastic spectrum of the material being tested. At low temperatures very little rearrangement of the molecules is possible within the period of deformation. This situation is also true for most high frequency measurements. This results in an equivalence. In both Storage Modulus and Tan Delta, insensitivity to frequency change is indicated by a relatively flat curve. As can be seen from FIGS. 1 and 2, almost all the Samples tested have good insensitivity to frequency change as indicated by the relatively flat curves.

In both Storage Modulus and Tan Delta, insensitivity to frequency charge is indicated by a relatively flat Shear Storage Modulus designated G' and represents the portion of the stress returned to the system when the imposed strain is removed. Maximization of this component of the material response is important for storing energy that can be returned to the system on demand.

Shear loss modulus (G") is the component of the stress out of phase with the imposed dynamic strain by 90°. This tests determines the viscous character of the material response A portion of the input energy is dissipated as heat and molecular motion and is not returned to the system when the imposed strain is completely removed. Maximizing the composition relative to sheer loss modulus is important for maximizing damping.

Figure 2:
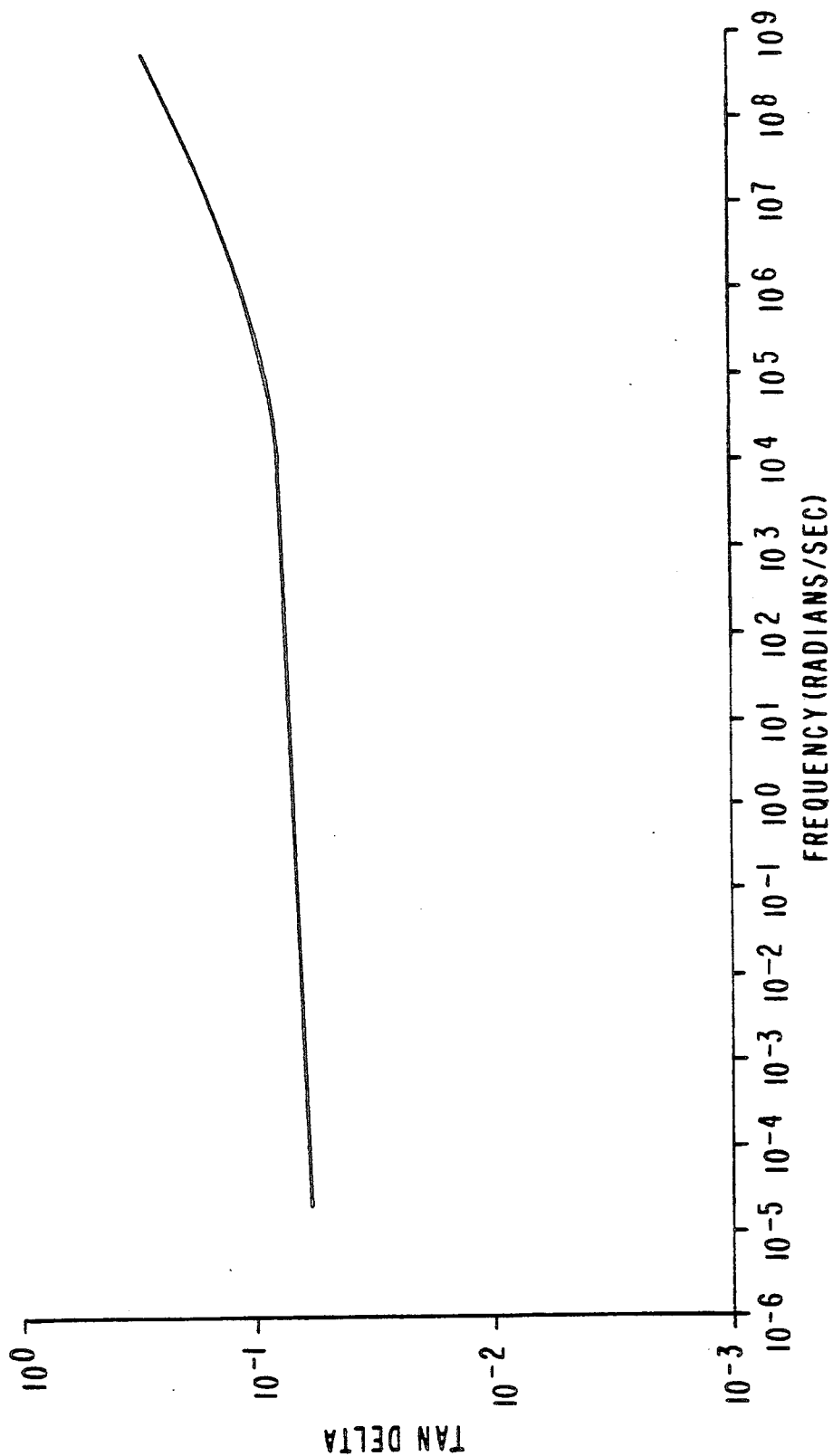
FIG. 2 is a time-temperature data shifted plot, shifted to 10° C., of Tan Delta vs. frequency in radians/second for the material described in Example 1.

In both sheer storage modulus and sheer loss modulus insensitivity to frequency change is in plots such as in FIGS. 1 and 2 indicated by a line having a low slope. Tan Delta ($\delta$) (G"/G' or J"/J') is the ratio of the loss component to the storage component of a material response as a result of an applied dynamic strain. This parameter is dimensionless and is a measure of material damping. It is also the unit energy dissipated per cycle per unit energy stored per cycle.

Acoustic tests were performed in a 6.1 meter long, circular pulse tube, shown in FIG. 3 of the Drawings. The pulse tube 10, contained a 5.08 cm thick section of the sample of the syntactic polyurethane-microsphere disc 11, attached to a 0.95 cm thick steel plate support 12, across the 13.8 cm pulse tube diameter (not drawn to scale). The disc 11, was a distance L2=4.26 meters (14 feet) from the pulse tube end and a chirp noise source 13. Sea water 14, at a temperature of 10° C., was inside the pulse tube testing and was pressurized over the range of 7.05 kg/cm$^2$ (100 psi) to 70.5 kg/cm$^2$ (1,000 psi). A hydrophone 15, a distance L1=1.22 meters (4 feet) from the front surface of the polyurethane-microsphere disc 11, was used to measure reflection loss of sound waves from noise source 13 after contacting the surface of the sheet 11. Another hydrophone 16, a distance L3=0.45 meter (1.5 feet) from the same front surface of the polyurethane-microsphere disc 11, but on the other side of the support plate 12, was used to measure insertion loss of sound waves from noise source 13 after passing through the polyurethane-microsphere disc 11 and the support plate 12.

Figure 5:
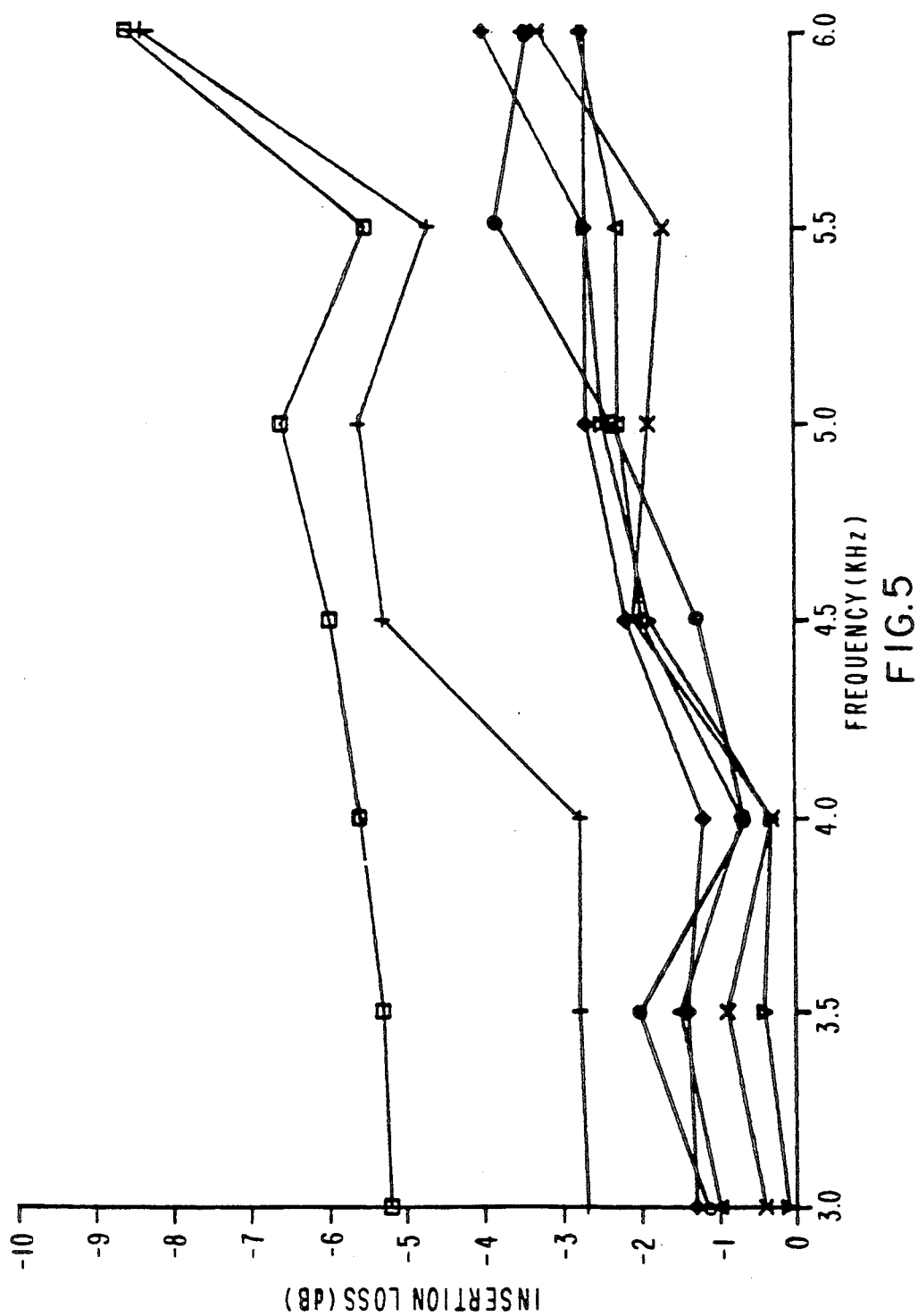
FIG. 5 is a plot of insertion loss in dB vs. frequency for the material described in Example 2.

Reflection loss is defined as 20Log$_{10}$ of the ratio of the pressure of the signal at hydrophone 15 to that emitted at source 13. Insertion loss is defined as 20 Log$_{10}$ of the ratio of the pressure of the signal at hydrophone 16 to that emitted at source 13. Complete reflection back from the polyurethane-microsphere disc gives a ratio of 1.0 for the ratio of the pressure of the signal at hydrophone 15 to that emitted at source 13, and thus a reflection loss of 20Log$_{10}$1.0 or 0 dB. A high numerical value of reflection loss, for example, $-15$ dB, indicates that a substantial amount of sound waves from noise source 13 are being absorbed or transmitted by the polyurethane-microsphere disc and a relatively small percentage are being reflected. Materials having high values of reflection loss over wide pressure and frequency ranges are acceptable. FIG. 4 shows that for the material of Example 2, high reflection loss values were recorded over a wide pressure and frequency range while the insertion losses were adequate (FIG. 5). In both FIG. 4 and FIG. 5: curve A with square points=100 psi, curve B with plus sign points=250 psi, curve C with diamond shaped points 400 psi, curve D with triangle shaped points=550 psi, curve E with X points=700 psi, curve F with inverted triangle shaped points=850 psi, and curve with circular points=1,000 psi.

Hydrophone 16 is positioned to measure the amount of sound waves passing through disc 11 and support 12 and provide a value for insertion loss. A high negative numerical value of insertion loss (high absolute value), for example, −10 dB means that sound waves from noise source 13 are less transmitted to the hydrophone 16 than if the value were 0 dB. Therefore, noise inside a room or inside an underwater vessel will not be transmitted to the outside as much when a high negative numerical value of insertion loss (high absolute value) is present as compared to a low negative value (low absolute value) of insertion loss. FIG. 4 shows that values for Sample 1 were within these ranges over most of the frequency range. In addition the significant insertion losses, FIG. 5, are helpful.

EXAMPLE 1

One equivalent of a polybutadiene based polyol having a nominal number average molecular weight of 2800 and a nominal equivalent weight of 1200 is combined with 4.0 equivalents of 1,4-butanediol (BD). The BD which is at about 25° C. is added to the polybutadiene based polyol, which is also at a temperature of about 25° C., under agitation. To this mixture under agitation is added 0.02% by weight dibutylin dilaurate, based on the combined weight of polyols and diisocyanate. Under agitation and at a temperature of about 25° C., the expanded microspheres are added to the mixture in a concentration of about 3.0% by weight of the total formulation. After addition of the microspheres, 5.0 equivalents of 4,4′-methylenebis(cyclohexylisocyanate) is added at a temperature of 25° C. and is stirred until a smooth mixture is obtained. Equivalent ratios of the isocyanate, the hydroxyl terminated polybutadiene and the butanediol of 5.0:1.0:4.0 respectively translates into about 655.9 parts by weight of the diisocyanate having an equivalent weight of 131.17; 1190.5 parts by weight of the polybutadiene, when its hydroxyl equivalent weight corresponds to 0.84 meq./g and 180.2 parts 1,4-butanediol. When the batch size of the polyols plus diisocyanate is 2026.6 g, the amount of the catalyst and the microspheres employed in the composition are essentially 0.41 parts and 62.8 parts by weight, respectively. The mixed material is then poured into molds which have been coated with a silicon or Teflon release agent. The resulting castings are demolded after curing overnight at ambient temperatures of about 25° C., postcured and conditioned at ambient temperature and humidity for at least seven days before Rheometric Spectrometric testing.

EXAMPLE 2

Polymer Synthesis and Treatment with its Extender

A prepolymer was prepared by treating 4,4′-diphenylmethane diisocyanate (MDI) with a polybutadiene based polyol. Equivalent ratios of MDI to the polybutadiene polyol of 5.0:1.0 respectively were used. This translates to 625.0 parts by weight MDI and 1190.5 parts by weight of the polyol when its hydroxyl content is 0.84 meq./g. The MDI is melted and brought to a temperature of about 50° C. and then is placed in a 5 or 12 liter size flask under a blanket of dry nitrogen having a dew point of less than −68° F. The dry nitrogen atmosphere is maintained throughout the preparation process. Liquid polybutadiene polyol is then added to the flask at a rate such that the exothermic heat of the reaction does not cause the temperature of the reacting material to exceed about 75° C. External cooling may be employed to facilitate charging of the flask. After completion of the addition of the polybutadiene polyol, the contents of the flask are stirred at 70° to 80° C. for about one and a half hours. The prepolymer is then degassed, poured into paint cans and sealed under dry nitrogen. Its isocyanate content or equivalent weight are measured using the dibutylamine method. For the formulation prepared, the isocyanate content of the prepolymer is about 9.25% ±0.3%. The prepolymer is then brought to a temperature of about 105°-115° C. and degassed at 2–4 Torr for about six minutes. A premixed extender consisting of about 151.1 parts by weight of an approximate 1000 number average molecular weight polyoxytetramethylene glycol (PTMG 1000, hydroxyl number = 111.4) and about 69.3 parts by weight of resorcinol di($\beta$-hydroxyethyl)ether, which thereby employs a respective equivalents ratio of 3:7, is heated to about 140°-150° C. and degassed at 2–4 Torr for about six minutes to remove any water present. The unexpanded polymeric microspheres are added to the prepolymer under agitation in a concentration of about 3% by weight of the total composition at a temperature of about 105° C. After the microspheres are mixed into the prepolymer, the extender which has cooled to a temperature of about 125° C. is added to the agitated prepolymer microsphere mixture which is now at about 100° C. The quantity of extender employed has been adjusted to provide a prepolymer to extender equivalent ratio of about 1.00:1.00. Thus, for example, should the prepolymer have an isocyanate equivalent weight of 465.6, which corresponds to 9.02% NCO, 465.6 parts by weight of prepolymer would be reacted with about 220.4 parts by weight of the above described extender solution. After completing the addition of the extender to the mixture of the prepolymer and the microspheres, agitation is continued for one minute. The material is then poured into molds which have been coated with release agent and are at a temperature of about 108°-112° C. The filled mold is cured by maintaining the mold at a temperature of 108–112° C. for about 20 hours. The foam composition displays a density of 0.493 g/cm$^3$.

Referring now to FIGS. 1 and 2, pertaining to the one-step material described in Example 1, the Rheometric Spectrometric curves show an adequately low slope of the storage modulus G′, versus frequency, a sufficiently high storage modulus and an adequate loss modulus. The modulus and dynamic/static characteristics (ratio of G′ at high to low frequency) are superior to those of the control, which is based on Polamine (an oligomeric diaminobenzoate) a trade product of Polaroid. The data (FIG. 1) show that the storage modulus of our material has risen slightly with increasing frequency, for example the increase in storage modulus over the frequency range from 10$^{-2}$ rad/s to 10$^7$ rad/s is about 1.67 Pa; whereas, over the same frequency range the storage modulus of the Polamine containing standard has increased by about 4.68 Pa, thereby emphasizing the much greater sensitivity to frequency changes of the standard material The standard Polamine based formulation is prepared by treating 1.00 equivalents of a polycarbodiimide/cycload-duct modified 4,4-diphenylmethane diisocyanate (available as Isonate 143L from Dow Chemical and as Rubinate XI-208 from Rubicon Chemicals Division of ICI) having an isocyanate equivalent weight of about 144.5 and having the general equilibrium and chemical structure of:

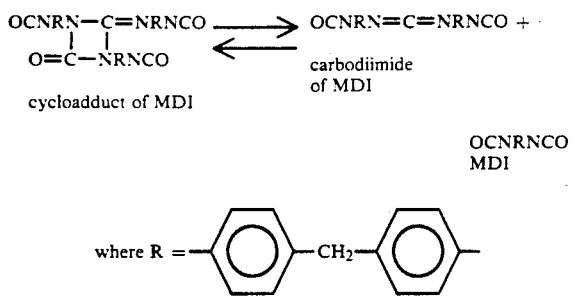

with 0.95 equivalents of Polamine 1000 (polytetramethyleneoxide-di-p-aminobenzoate) having an average amine equivalent weight of essentially 619 and a number average molecular weight of essentially 1238). The above mixture contains about 3 wt. % preexpanded hollow microspheres.

Our material has outstanding hydrolytic stability as compared to the Polaroid Polamine containing material which contains hydrolyzable ester groups.

Acoustic tests of Example 2 were performed in a pulse tube over a frequency range of 3 to 6 kHz and a pressure range of 100–1000 psi in 10° C. seawater in which both insertion and reflection loss measurements were made with the results shown in FIGS. 4 and 5. The test data showed good loss characteristics. The axial deformation tests under pressure (FIG. 6) indicate the composition of the present invention will respond well during deep submergence of a substrate.

The preferred methods of preparing the foam composition of the present invention is by reacting a prepolymer and an extender or by combining the components of the present invention in a one step process. The extender, which together with the prepolymer provide formation of the polymer structure, contains a high and low molecular weight polyol. It includes a polyoxytetramethylene glycol having a molecular weight of about 500 to 2000, resorcinol di($\beta$-hydroxyethyl)ether (HER) or hydroquinone di($\beta$-hydroxyethyl)ether (HQEE). The composition may optionally include a catalyst such a dibutyl tin dilaurate. The prepolymer is prepared by reacting an excess of 4,4'-methylene-bis(phenylisocyanate) with a hydroxy containing polybutadiene of molecular weight of about 1200. The one-step method is prepared by reacting 4,4'-methylene-bis(cyclohexylisocyanate) with an approximate 1200 molecular weight polybutadiene based polyol and 1,4-butanediol. Optionally a catalyst, dibutyltin dilaurate can be employed Prior to preparing the foam the hollow polymeric microsphere are dispersed into the prepolymer or in the case of the one-shot material the polyol mixture.

It will be appreciated that the above described invention provides a hydrolytically stable acoustic absorption and low reflection compositions containing polybutadiene based polymers.

Whereas particular embodiments of the invention have been described above for purposes of illustration, it would be appreciated by those skilled in the art that the numerous variations of the details may be made without departing from the invention as described in the appended claims.

We claim:

1. An acoustic composition consisting essentially of: (a) about 1 equivalent of a polybutadiene based polyol having a molecular weight of about 500 to 10,000 and a hydroxy equivalent weight of about 1100 to 1400; (b) about 2.8 to 6.8 equivalents of a polyol selected from the group consisting of polyoxytetramethylene glycol; 1,4-butane-diol; resorcinol di($\beta$-hydroxy ethyl)ether; hydroquinone di($\beta$-hydroxyethyl)ether, and mixtures thereof; (c) about 3.8 to 7.8 equivalents of a diisocyanate selected from the group consisting of carbodiimide derivative of diphenylmethane diisocyanate; 2,4- and 2,6-toluene diisocyanates; 4,4'-methylene-bis(cyclohexyldiisocyanate); isophorone diisocyanate; and 4,4'-methylene-bis(phenylisocyanate); and (d) about 1.5% to 6.8% by weight of the total composition of hollow polymeric microspheres, where the composition is curable to an acoustic sound reduction material having inertness toward moisture and pressure.

2. The composition according to claim 1 wherein the composition comprises up to about 0.20% by weight of a catalyst.

3. The composition of claim wherein the polybutadiene based polyol has a equivalent weight of 800 to 1500.

4. The composition according to claim 1 wherein said polymeric microspheres are comprised of copolymers in which vinylidene chloride was the principal raw ingredient.

5. The composition according to claim 4 wherein said microspheres are expanded.

6. The composition according to claim 4 wherein said microspheres are unexpanded when first introduced into the resin component mixture.

7. The composition according to claim 1 wherein component (a) is a polybutadiene based polyol having a molecular weight of about 2800 and a hydroxy equivalent weight of about 1190; component (b) is 1,4-butanediol; component (c) is 4,4'methylene-bis(cyclohexylisocyanate) and a catalyst of dibutyl tin dilaurate is added.

8. An acoustic composition consisting essentially of:
(a) a prepolymer consisting of about 1 equivalent of a polybutadiene based polyol having a molecular weight of about 500 to 10,000 and a hydroxy equivalent weight of about 1100 to 1400 and about 2.5 to 7.5 equivalents of a diisocyanate selected from the group consisting of aromatic and cycloaliphatic diisocyanates;
(b) an extender consisting of about 0.1 to 0.5 equivalents of polyoxytetramethylene glycol per 0.5 to 0.9 equivalent of an ether selected from the group consisting of resorcinol di(62-hydroxyethyl) ether and hydroquinone di(62-hydroxyethyl)ether; and
(c) about 1.5% to 6% by weight of the total composition of hollow polymeric microshperes, where the composition is curable to an acoustic sound reduction material having inertness toward moisture and pressure.

9. The composition of claim 8 wherein the isocyanate terminated prepolymer has an equivalent weight of 350 to 700.

10. The composition according to claim 8 wherein the diisocyanate is selected from the group consisting of carbodiimide derivative of 4,4'-diphenylmethane diisocyanate; 2,4- and 2,6-toluene diisocyanates; 4,4'-methylene-bis(cyclohexyldiisocyanate); isophorone diisocyanate; and 4,4'-methylene-bis(phenylisocyanate; and the polyoxytetramethylene glycol has a number average molecular weight of about 1000, and the equivalents ratio of prepolymers:extender is from 0.85:1.0, to 1.2:1.0.

11. The composition according to claim 8 wherein aid polymeric microspheres are based on copolymers and/or terpolymers with polyvinylidene chloride being the principal component.

12. The composition according to claim 11 wherein said microspheres are expanded.

13. The composition according to claim 11 wherein aid microspheres are unexpanded when first introduced into the resin component mixture.

14. A curable acoustic composition consisting essentially of the admixture:
  (a) a prepolymer prepared by reacting 4,4'-methylene-bis(phenylisocyanate) with a hydroxy containing polybutadiene having a number average molecular weight of about 2800 and a hydroxyl equivalent weight of about 1190 in the equivalents ratio of about 5:1, respectively;
  (b) about 3 percent by weight of unexpanded hollow polymeric microshperes based on the total weight of the composition, which microspheres will expand during the cure of the material;
  (c) about one equivalent of an extender per equivalent of the prepolymer described in (a) above, the extender comprising a mixture of an about 1000 number average molecular weight polyoxytetramethylene glycol and resorcinol di($\beta$-hydroxyethyl)ether in the equivalents ratio of about 0.3:0.7, respectively, where the unexpanded polymeric microshperes have a density of about 1.3 g/cm$^3$ and a particle size diameter in the range of about 5 micrometers-20 micrometers and are based on copolymers or terpolymers in which vinylidene chloride is the principal monomer employed in their synthesis, and such spheres contain gas such as i-butane as the blowing agent, and where the composition is curable to an acoustic sound reduction material having inertness toward moisture and pressure.

15. The composition according to claim 1 wherein the polybutane based polyol has a molecular weight of 1600 to 4000, a hydroxyl value of between about 0.7 meq./g and 0.9 meq./g, a hydroxyl functionality of about 2 to 3, with unsaturation ranging from 1 double bond per 4 carbon atoms to 1 double bond per 12 carbon atoms, and the composition displays a low sensitivity to wide changes in frequency and temperature.

16. The composition according to claim 8 wherein the polybutane based polyol has a molecular weight of 1600 to 4000, a hydroxyl value of between about 0.7 meq./g and 0.9 meq./g, a hydroxyl functionality of about 2 to 3, with unsaturation ranging from 1 double bond per 4 carbon atoms to 1 double bond per 12 carbon atoms, and the composition displays a low sensitivity to wide changes in frequency and temperature.

17. The composition according to claim 14 wherein the polybutane based polyol has a molecular weight of 1600 to 4000, a hydroxyl value of between about 0.7 meq./g and 0.9 meq./g, a hydroxyl functionality of about 2 to 3, with unsaturation ranging from 1 double bond per 4 carbon atoms to 1 double bond per 12 carbon atoms, and the composition displays a low sensitivity to wide changes in frequency and temperature.

* * * * *